United States Patent [19]

Nagayama et al.

[11] Patent Number: 5,226,034
[45] Date of Patent: Jul. 6, 1993

[54] ELECTRICALLY REMOTE-CONTROLLED TYPE MIRROR ASSEMBLY

[75] Inventors: Yoshirou Nagayama, Isehara; Takao Sekino, Hiratsuka, both of Japan

[73] Assignee: Ichikoh Industries, Ltd., Tokyo, Japan

[21] Appl. No.: 800,514

[22] Filed: Dec. 3, 1991

Related U.S. Application Data

[63] Continuation-in-part of Ser. No. 717,656, Jun. 19, 1991, abandoned.

[30] Foreign Application Priority Data

Jun. 19, 1990 [JP] Japan ................... 2-158617

[51] Int. Cl.⁵ .................. G02B 7/18; B60R 1/06
[52] U.S. Cl. .................. 359/873; 359/874; 359/876; 359/877; 248/480; 248/487; 74/89.12; 74/89.15
[58] Field of Search .............. 359/841, 872, 873, 874, 359/876, 877; 74/89.11, 89.12, 89.15, 89.16; 248/480, 481, 484, 485, 486, 487, 900

[56] References Cited

U.S. PATENT DOCUMENTS

| | | | |
|---|---|---|---|
| 4,267,494 | 5/1981 | Matsuoka | 350/637 |
| 4,498,738 | 2/1985 | Kumai | 350/637 |
| 4,506,954 | 3/1985 | Enomoto | 350/634 |
| 4,555,166 | 11/1985 | Enomoto | 350/634 |
| 4,632,525 | 12/1986 | Hayashi et al. | 359/877 |
| 4,678,295 | 7/1987 | Fisher | 359/877 |
| 4,696,555 | 9/1987 | Enomoto | 359/874 |
| 4,877,214 | 10/1989 | Toshiaki | 350/637 |
| 4,881,418 | 11/1989 | Fimeri | 350/637 |
| 4,915,493 | 4/1990 | Fisher et al. | 359/877 |
| 4,940,321 | 7/1990 | Yoshida | 359/877 |
| 4,986,646 | 1/1991 | Hamamoto et al. | 350/637 |

FOREIGN PATENT DOCUMENTS

| | | | |
|---|---|---|---|
| 3609695 | 9/1986 | Fed. Rep. of Germany. | |
| 0087340 | 4/1988 | Japan | 359/877 |

*Primary Examiner*—Bruce Y. Arnold
*Assistant Examiner*—R. D. Shafer
*Attorney, Agent, or Firm*—Foley & Lardner

[57] ABSTRACT

The electrically remote-controlled type mirror assembly has a pair of plungers to tilt the mirror body supporting the mirror horizontally and vertically, respectively, within certain pivoting angles. The mirror assembly has a sliding mechanism including another motor to axially slide at least one of these plungers beyond said certain pivoting angles of the mirror body. The sliding mechanism is so arranged as to have no influence on the adjustment of the mirror angle within the certain pivoting angles of the mirror body. Thus, the mirror posture can be changed quickly from the mirror angle adjusted within the certain pivoting angle for ordinary car driving to the mirror angle with which the mirror is tilted further downward, and also the initially adjusted mirror angle can be restored accurately.

9 Claims, 9 Drawing Sheets

ELECTRICALLY REMOTE-CONTROLLED TYPE MIRROR ASSEMBLY

This is a continuation-in-part of application Ser. No. 07/717,656 filed Jun. 19, 1991, now abandoned.

BACKGROUND OF THE INVENTION

1. Field of the Invention

The present invention relates to a remote-controlled rearview mirror assembly such as automobile door mirror assembly, of which the mirror is supported freely tiltably relative to the housing thereof, and more particularly, to an improved and novel electrically remote-controlled type mirror assembly, of which the mirror can be quickly and simply tilted vertically beyond the adjustable range of the mirror angle for ordinary driving of a car in order to view the car rear wheel and its vicinity.

2. Prior Art Statement

An electrical remote-control type automobile mirror assembly is disclosed in, for example, the U.S. Pat. No. 4,555,166, of which the mirror is supported tiltably relative to the housing thereof and can be turned vertically and horizontally by means of remote-controlled motors.

FIGS. 1 and 2 show together an example of the well-known mirror assembly of this type.

FIG. 1 is a front view showing the drive unit from which the mirror body is removed, the casing 1 of the drive unit being partially cut off. FIG. 2 is a sectional view taken along the line II—II, showing the drive unit, shown in FIG. 1, to which the mirror body is mounted.

Two axes X—X' and Y—Y' perpendicular to each other are set as shown in FIG. 1. There is provided at the intersection 0 of these axes a ball-and-socket joint 2 by which the mirror body 3 is tiltably supported as shown in FIG. 2. The reference numeral 4 indicates a mirror proper.

As shown in FIG. 1, plungers 5 are provided on the axes X—X' and Y—Y', respectively. The plunger 5 has provided at the end thereof a ball-and-socket joint 6 coupled to the mirror body 3, as shown in FIG. 2. The plunger 5 has formed axially therein a recess 7 in which a projection 8 provided on the drive casing 1 is engaged against axial pivoting of the plunger 5 relative to the drive housing, and it has fitted thereon a gear 9 at the last step of speed reduction. The gears 9 are rotated by motors 10, respectively, each by means of a speed reduction gear train 11.

As described above, the plunger 5 is blocked against axial pivoting and has formed on the outer circumference thereof a male thread which is in mesh with the gear 9. Thus, as the gear 9 is rotated, the plunger 5 is axially driven to tilt the mirror body 3.

The adjustable range of the angular position of the mirror 4 tilted by the above-mentioned drive unit (see FIGS. 1 and 2) is so set as to cover the necessary viewing range for an ordinary driving of the car on the road. Also, the tilt speed of the mirror body 3 is limited to such an extent as to be adjustable with an accuracy required in practice. This is because if the mirror body is tilted too quickly, it is rather difficult to adjust the tilt angle as desired.

However, in any special driving of the car, for example, when moving the car backward in the vicinity of a road edge or in the direction of its width, it is desired in some cases to have a vision of the rear wheel and its vicinity, of which the image is viewed as reflected by the door mirror (this vision will be referred to as "reflected image" hereinafter).

FIG. 3 is a schematic explanatory drawing showing the relation between the mirror angle and field of view.

The point "Eye" in FIG. 3 indicates the position of the driver's eyes. To view a car behind or the like in the ordinary driving of a car, the door mirror posture (theoretically a door mirror angle relative to the road surface, or practically a door mirror angle relative to the car body—this angle will be referred to as "mirror angle" hereinafter) is so adjusted as to view the reflected image within the angular range $\theta$ shown in FIG. 3.

When moving the car backward in the vicinity of a road edge, the reflected image within the angle $\phi$ in FIG. 3 can desirably be viewed by tilting down the mirror body. For this desirable condition, it is required that the rear wheel should be within the angular range $\phi$ and that the road surface over the distance D necessary for knowing the position of the car behind should also be within this angular range $\phi$.

For the driver to view the reflected image of the rear wheel and its vicinity, the door mirror should be tilted down through a predetermined angle from the mirror angle set for rear viewing during ordinary driving of the car. Varying from one car model to another, the predetermined angle ranges from 5° to 7°. Concerning a certain car model, the predetermined angle is generally constant irrespective of the driver's sitting height.

Indeed in the conventional remote-controllable door mirrors, the range of the mirror tilt by the drive unit can be increased for the driver to view the rear wheel and its vicinity; such door mirrors are disadvantageous in the following:

(a) If the normal adjustable range of the mirror angle is increased with the mirror tilt speed not changed, the time taken for the mirror operation is longer;

(b) If the mirror tilt speed is increased correspondingly to the increase of the adjustable range of the mirror angle, the mirror angle cannot be adjusted accurately for rear viewing during ordinary car driving; and (c) Further in any of the above two cases, once the mirror posture is changed from a position in which the mirror angle is so set that the reflected image within the angular range $\theta$ shown in FIG. 3 can be viewed (which position will be referred to as "rear-viewing position for ordinary car driving" hereinafter) to a state in which the mirror angle is so set that the reflected image within the angular range $\phi$ shown in FIG. 3 can be viewed (which position will be referred to as "rear-viewing position for rear-wheel checking" hereinafter), the mirror angle must be readjusted to restore the rear-viewing position for ordinary car driving because the initial angular position has been lost.

SUMMARY OF THE INVENTION

The present invention has an object to provide an electrically remote-controlled type mirror assembly of which the mirror can be simply and quickly shifted from the rear-viewing position for ordinary car driving to that for rear-wheel checking or vice versa without any influence on the accuracy of mirror-angle adjustment for rear viewing during ordinary car driving.

The present invention has another object to provide an electrically remote-controlled type mirror assembly of which the mirror can be accurately returned to the initial mirror angle when the rear-viewing position for ordinary car driving is restored after the mirror is shifted from the rear-viewing position for ordinary car driving to that for rear-wheel checking.

The above objects can be attained by providing an electrically remote-controlled type mirror assembly comprising, according to the present invention, a pair of plungers used to adjust the mirror angle for rear viewing during ordinary car driving (each plunger is driven axially by means of a corresponding motor and reduction gear train) and a sliding mechanism having a third motor and which quickly slides the one of the plungers, that serves to axially tilt the mirror vertically beyond the ordinary adjustable range of mirror angle in order to view the rear wheel.

Such sliding mechanism can be composed, by way of example, of a slider provided at one end thereof with a male thread which is in mesh with a female thread formed on the inner wall of the plunger and also with a rack at the outer circumference thereof, a reduction gear train including a pinion which is in mesh with the rack, and a motor which drives the reduction gear train.

The plunger itself is not of a structure in which it is in mesh with a driving cylinder on which the last-stage gear of the reduction gear train is formed, but has a guide penetrated through the driving cylinder and which slides along a guide recess formed as orientated axially in the inner wall of the driving cylinder. Therefore, the plunger is blocked against rotation relative to the driving cylinder while being permitted to move axially. When the mirror angle is adjusted for rear viewing during ordinary car driving, the slider is blocked against movement due to the engagement between the rack and pinion and the plunger is screwed axially while being rotated along with the driving cylinder since the female thread of the plunger is in mesh with the male thread of the slider. On the other hand, when the mirror is shifted from the rear-viewing position for rear-wheel checking to that for ordinary car driving, the plunger is moved by means of the slider while being not rotated relative to the driving cylinder. Also, when the mirror is shifted from the rear-viewing position for rear-wheel checking to that for ordinary car driving, the plunger is pulled and moved by the slider in the opposite direction while not being rotated relative to the driving cylinder. Because of this arrangement, the positional relation between the plunger and slider remains unchanged even with the mirror angle adjusted for rear viewing during ordinary car driving, so that when the motor run is controlled for both the forward and backward moving distances of the slider to be the same, the original mirror angle can be accurately restored when the mirror is shifted from the rear-viewing position for rear-wheel checking to that for ordinary car driving.

The sliding mechanism arranged as mentioned above will not interfere with the plunger movement which is made to adjust the mirror angle correspondingly to the driver's sitting height for rear viewing during ordinary car driving, and the angular range of the mirror for viewing the rear wheel may be determined depending upon a predetermined axial moving distance of the slider.

More particularly, the slider itself may be composed of a driving shaft provided at one end thereof a male thread which is in mesh with the female thread of the plunger, a cylindrical member provided with a rack which is in mesh with the pinion and a friction clutch which couples the driving shaft and the cylindrical member to each other. At the rear-viewing position for ordinary car driving, the rear end of the cylindrical member is in contact with the inner wall of the drive unit against any further backward sliding. In this arrangement, as the plunger is moved forward by the driving shaft while the positional relation between the plunger and slider with the mirror angle adjusted for ordinary car driving remains unchanged, the mirror body tilts downward beyond the mirror angle for ordinary car driving. Since a stopper formed at a portion of a ball-and-socket joint tiltably supporting the mirror body defines a lower limit of the mirror body tilt angle at which the rear wheel can be viewed, the friction clutch is released when the mirror body abuts the stopper. More particularly, the friction clutch is not released immediately when the mirror body abuts the stopper but the friction clutch is kept in engagement until a clearance between the female thread formed on the inner wall of the plunger and the make thread formed on the end portion of the slider is substantially eliminated.

The motor run is controlled as follows. The motor is stopped from running after the friction clutch is released following the slider-driven forward sliding of the plunger. Thereafter, the motor is put into reverse run so that the plunger slides in the opposite direction until the rear end of the slider touches the inner wall of the drive unit, and then the motor stops running. During sliding of the slider in the opposite direction, only the cylindrical member initially slides, then the cylindrical member engages the driving shaft, and thereafter the cylindrical shaft and driving shaft slide together while the positional relation between the plunger and slider is kept unchanged.

Also, such sliding mechanism may be provided for the plunger which tilts the mirror horizontally as well as for the plunger which tilts the mirror vertically, in order to tilt the mirror laterally through an increased angle. Thus, the mirror assembly according to the present invention is very advantageous from the standpoint of safety drive since the driver can have a wider lateral field of view when passing through the merging point of highway traffic lanes.

BRIEF DESCRIPTION OF THE DRAWINGS

FIGS. 4 to 13 show together an embodiment of the electrically remote-controlled type mirror assembly according to the present invention, in which FIG. 4 is a schematic front view showing the remote-controlled type mirror assembly as a whole, from which the mirror body supporting the mirror and upper casing of the mirror drive unit are removed; .

FIG. 5 is a partially fragmentary, enlarged-in-scale side elevation showing the essential portion of the remote-controlled type mirror assembly;

FIG. 6 is a reduced-in-scale sectional view taken along the line VI—VI in FIG. 5;

FIG. 7 is also a reduced-in-scale sectional view taken along the line VII—VII in FIG. 5;

FIG. 8 is an exploded perspective view showing schematically the sliding mechanism of the plunger;

FIGS. 9 to 12 are explanatory drawings showing the operation of the remote-controlled mirror assembly; and FIG. 13 is a diagram of the control circuit which controls the axial sliding distance of the plunger.

DETAILED DESCRIPTION OF THE PREFERRED EMBODIMENT

Figure 1:
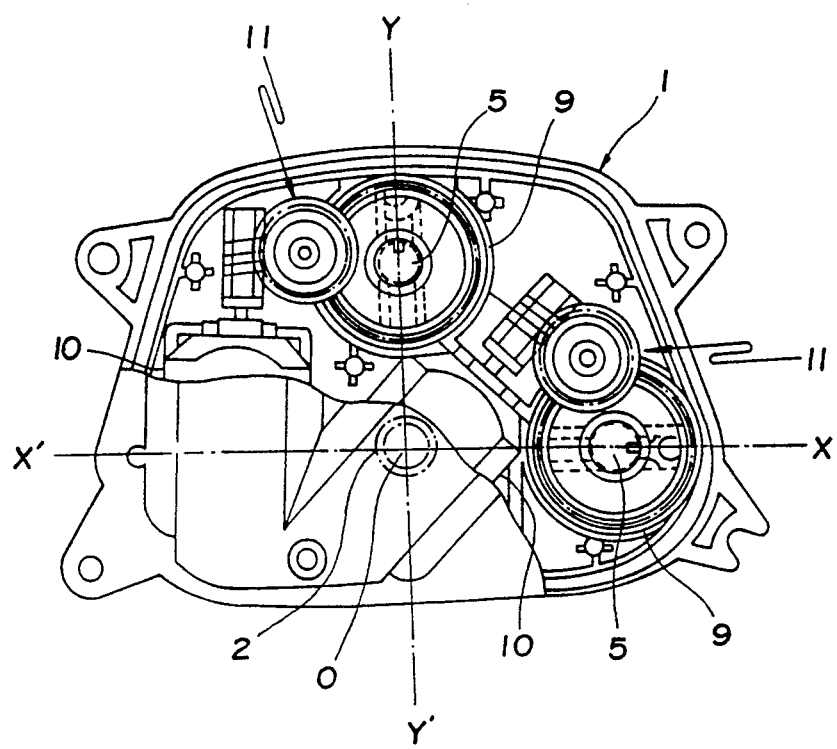
FIG. 1 is a partially fragmentary front view of the mirror drive unit of a conventional electrical remote-control type mirror assembly.
Figure 2:
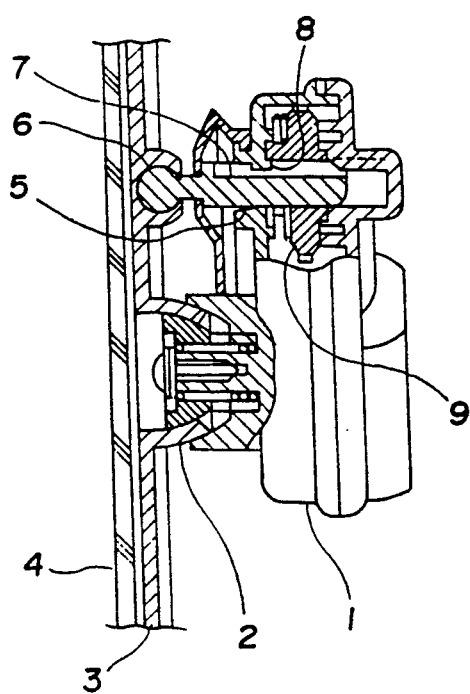
FIG. 2 is a partially fragmentary side elevation of the mirror drive unit in FIG. 1 to which the mirror body supporting the mirror is installed.
Figure 3:
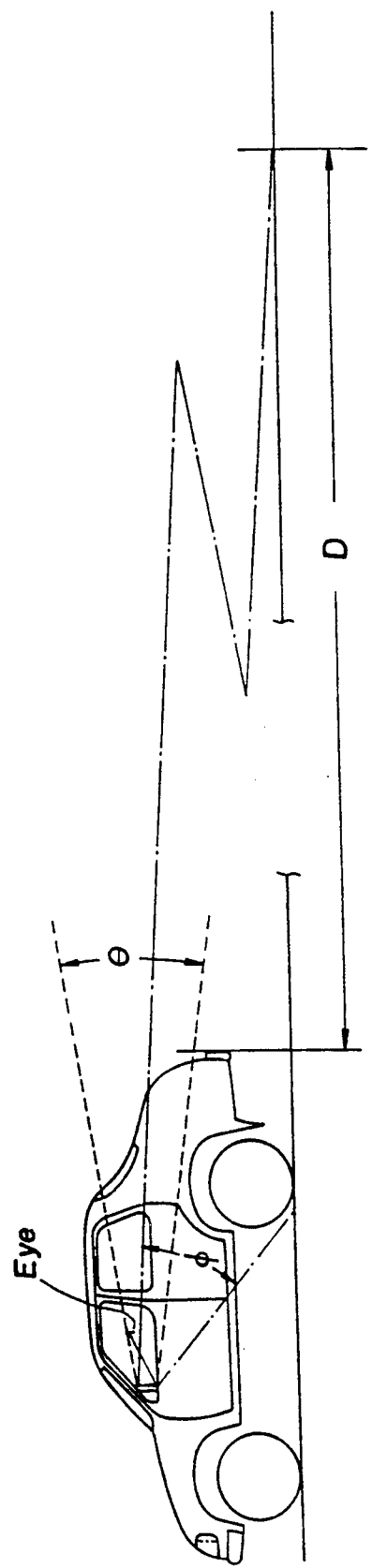
FIG. 3 is a schematic drawing for explaining the relation between the mirror angle and field of view in a standard door mirror.
Figure 4:
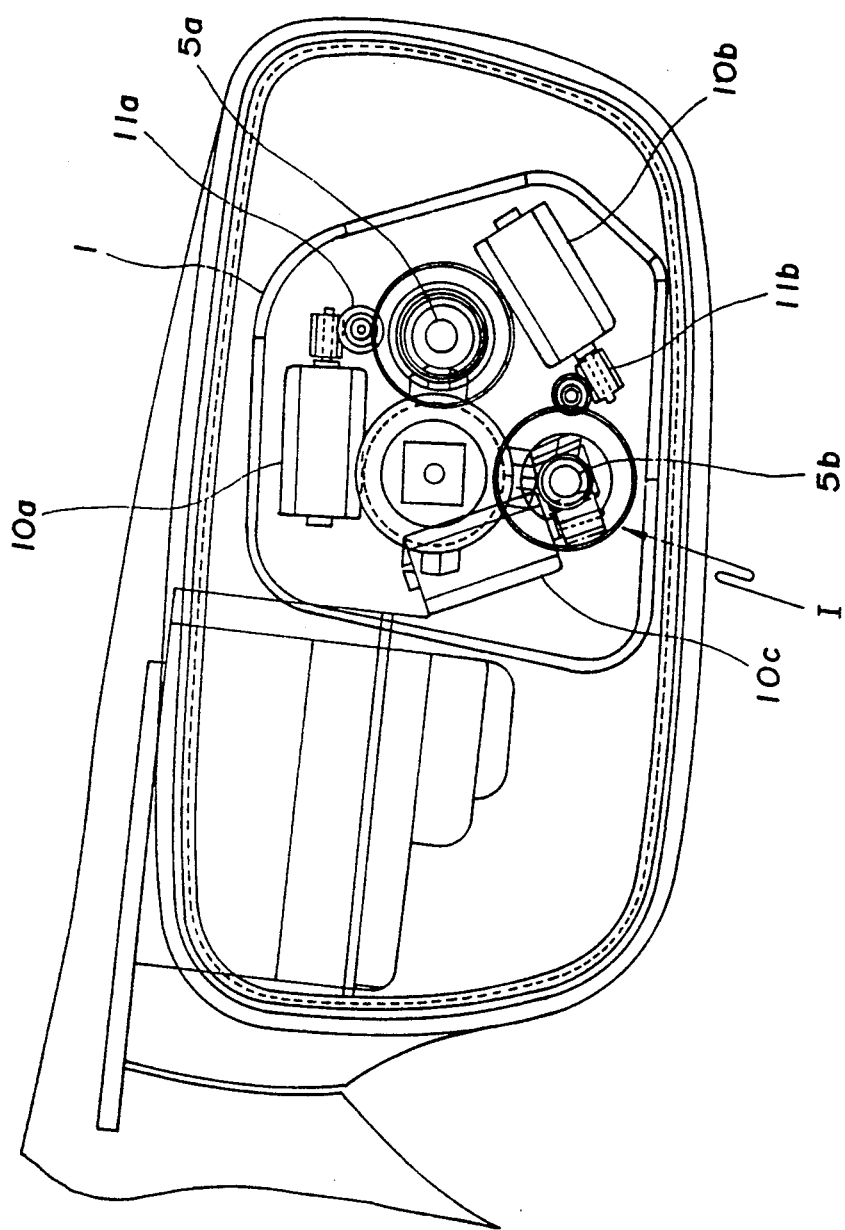

FIGS. 4 to 13 show together an embodiment of the electrically remote-controlled type mirror assembly according to the present invention. In these figures, the same or similar elements as or to those in the conventional electrical remote-control type mirror assembly in FIG. 1 are indicated with the same numerals as those in FIGS. 1 and 2.

A mirror drive unit 1 supports tiltably a mirror body 3 by means of a ball-and socket joint 2 and a mirror itself 4 is secured to the mirror body 3. The ball-and-socket joint 2 comprises a spherical seat 1a formed on the mirror drive unit 1, on which a spherical member 3a formed on the rear side of the mirror body 3 is fitted.

There are disposed inside the mirror drive unit 1 a plunger 5a which tilts the mirror 4 horizontally and a plunger 5b which tilts the mirror 4 vertically. These plungers 5a and 5b are driven by motors 10a and 10b, respectively, by means of reduction gear trains 11a and 11b, respectively. The mechanism to tilt the mirror 4 horizontally, that is, the mechanism consisting of the plunger 5a, reduction gear train 11a and motor 10a, is similar to that included in the conventional electrical remote-control type mirror assembly. So this mechanism will not be explained any further below. The mechanism which tilts the mirror 4 vertically does not only include a mechanism (plunger 5b, reduction gear train 11b and motor 10b) adapted for adjustment of the mirror angle for ordinary car driving but also a mirror tilting mechanism I which permits a quick adjustment of mirror angle beyond the normal adjustable range in order to view and check the rear wheel of the car.

Figure 5:
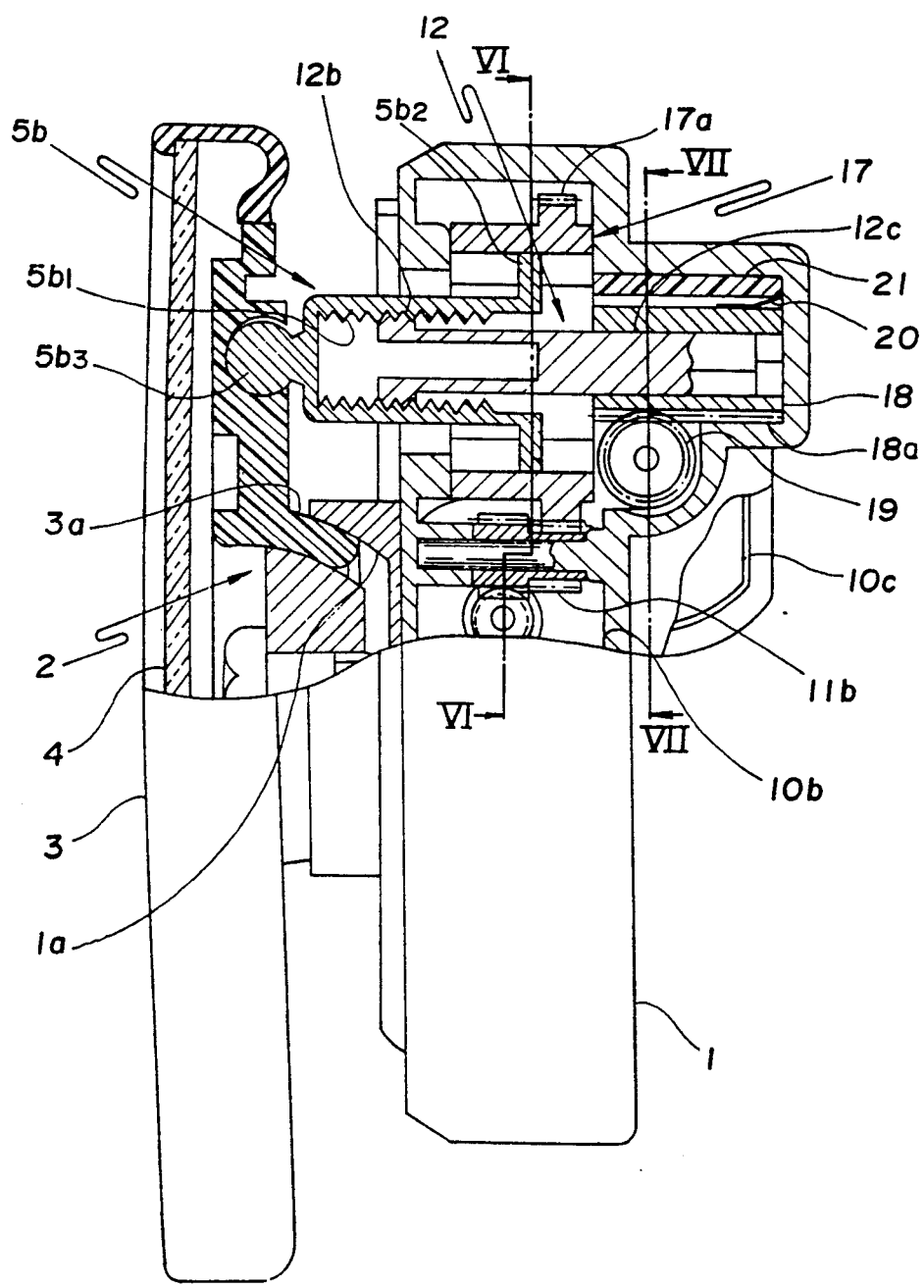
Figure 6:
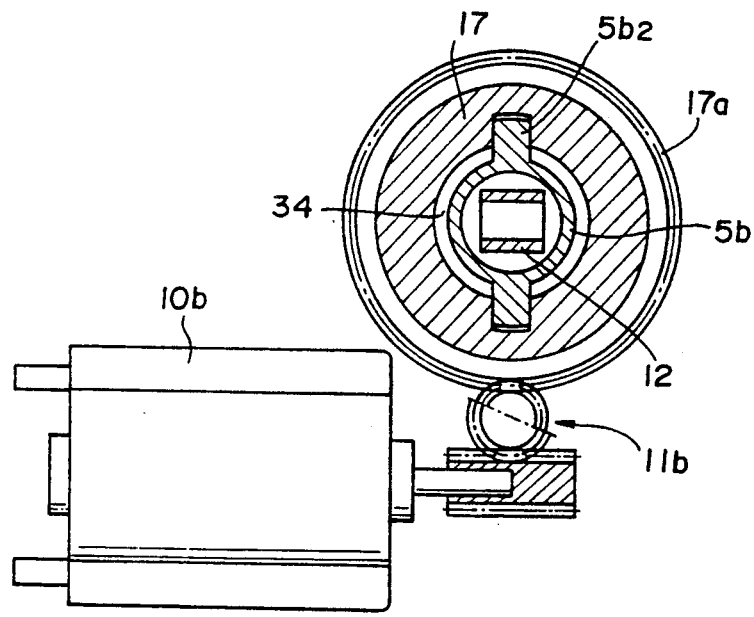

As shown in FIG. 5, the plunger 5b is a hollow cylinder open at one end thereof, and has a female thread 5b1 formed on the inner circumference thereof. It also has formed on the outer circumference thereof near the open end thereof a pair of protrusions 5b2 opposite to each other and extending radially, and at the other end thereof a spherical member 5b3 which is fitted in a spherical seat formed on the rear side of the mirror body 3.

The reference numeral 17 indicates a driving cylinder which drives and rotates the plunger 5b. This driving cylinder 17 is rotatably supported to the mirror drive unit 1. The driving cylinder 17 has formed therein an opening 34 through which a plunger 5b is inserted, and formed on the outer circumference thereof a gear 17a forming the last-stage gear of the reduction gear train 11b. There is provided as directed axially in the inner wall defining the opening 34 guide recesses 36 which guides the pair of protrusions 5b2 of the plunger 5b, and thus the plunger 5b is slidable relative to the driving cylinder 17 but not rotatable about the axis of the cylinder.

The reference numeral 12 indicates a square driving shaft provided at one end thereof with a male thread member 12b which is in mesh with the female thread 5b1 of the plunger 5b. The male thread member 12b is composed of a pair of resilient arms facing each other and a pair of male threads formed on the end portions, respectively, of the arms. The driving shaft 12 has a square shaft body 12c which is fitted in a square cylindrical member 18 having a rack 18a formed on the outer wall thereof. The square shaft body 12c forms together with the square cylindrical member 18 a slider 50 which slides the plunger 5b axially. The rack 18a engages a pinion 19 driven by a motor 10c, and the slider 50 is slid axially as the motor 10c runs forward or backward.

Figure 7:
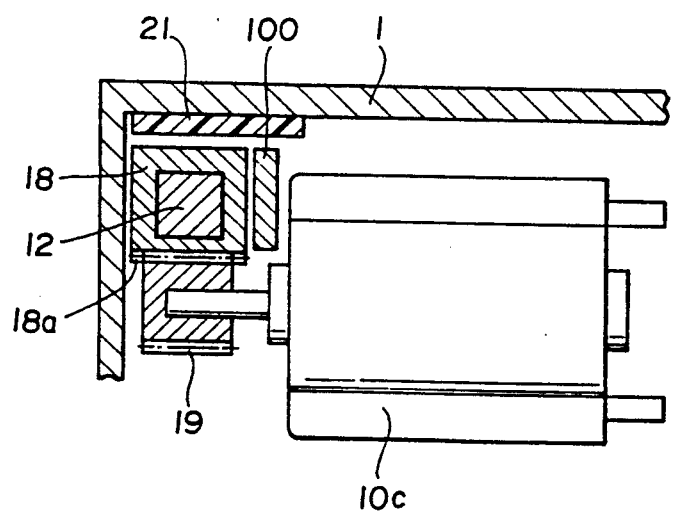
Figure 8:
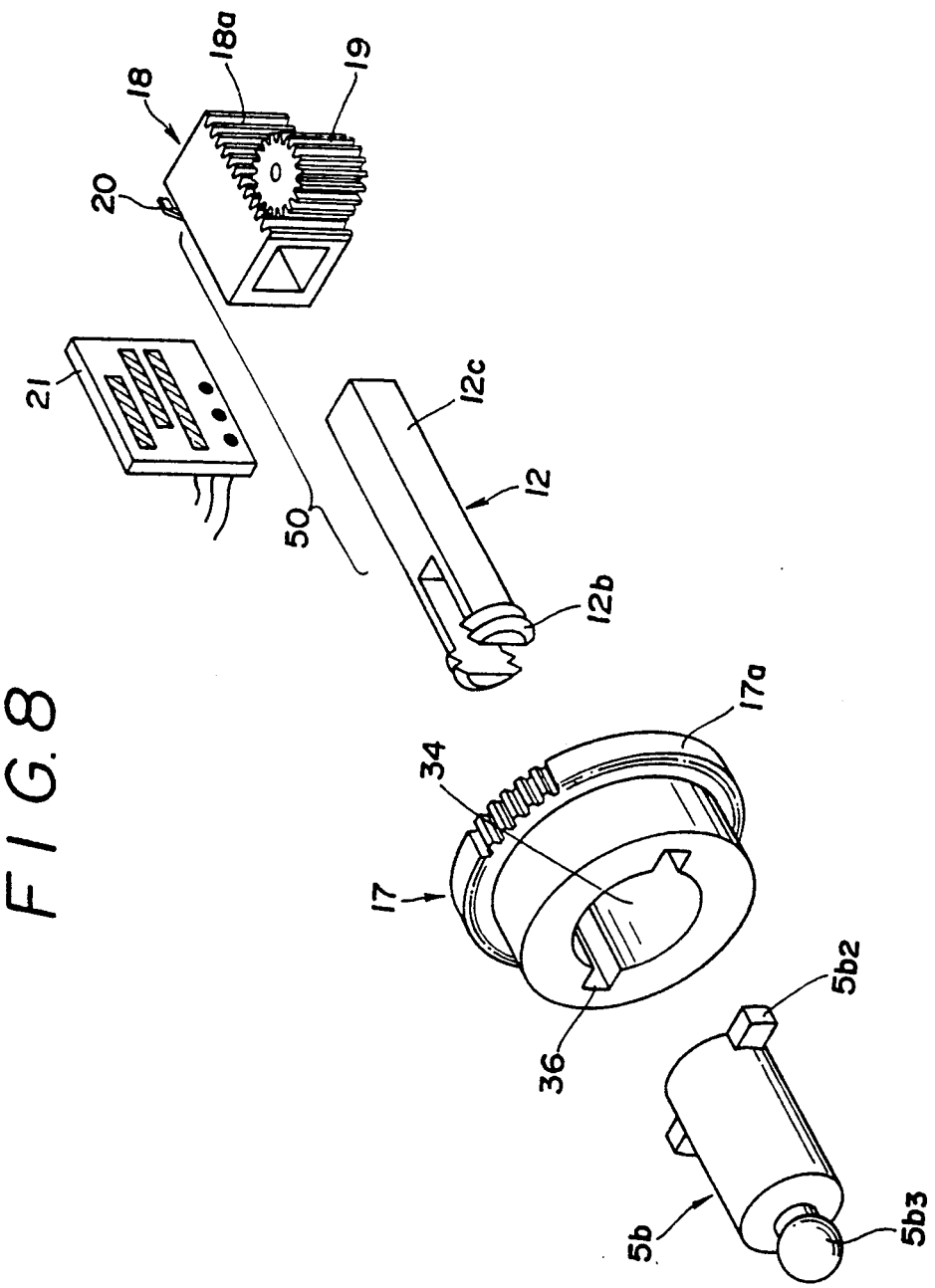

The slider 50 is guided in a guideway defined by a guide wall indicated with the reference numeral 100 in FIG. 7 (formed on the inner wall of the casing of the mirror drive unit) and the inner wall of the mirror drive unit 1 that is opposite to the guide wall. Note that the width of the guideway 100 is shown as exaggerated for discrimination of each element in FIG. 7, but the real width of the guideway is such that the slider 50 can slide smoothly forward or backward. Thus, the slider 50 is blocked against a horizontal deflection. Also owing to an engagement between the rack 18a and pinion 19 as well as to the resilient contact between a moving contact train 20 and circuit board 21, which will be further described later, the slider 50 is blocked against a vertical deflection. When the mirror angle is adjusted to the normal adjustable range, the rear end of the square cylindrical member 18 forming a part of the slider 50 is in contact with the bottom of the drive unit 1 and thus the backward movement thereof is limited.

In this embodiment, an appropriate friction exists between the square shaft body 12c of the driving shaft 12 and the inner wall of the square cylindrical member 18 and so there is transmitted between the square shaft body 12c and the inner wall a sufficient force to keep a mirror angle adjusted for rear viewing during ordinary car driving and to cause the plunger 5b to slip when this plunger 5b is further tilted through a predetermined angle beyond the adjusted mirror angle until the spherical member 3a of the mirror body 3 abuts at a portion thereof the flat bottom of the spherical seat 1a. Namely, the flat bottom of the spherical seat 1a is adapted to serve as a stopper which limits a tilting beyond a predetermined angle exceeding the adjusted mirror angle of the mirror body 3. To this end, at least one of both these members is made of a rigid silicon rubber on a silicon rubber sheet is attached on the surface of the square shaft body 12c so that the driving shaft 12 and square cylindrical member 18 form together a friction clutch to prevent the motor 10c from being overloaded.

As mentioned above, the driving cylinder 18, plunger 5b and driving shaft 12 form together a telescopic structure, and thus the mirror tilting mechanism I for rear-wheel checking can be designed compact within the mirror drive unit 1.

Referring now to FIGS. 9 to 12, the adjustment of mirror angle will be explained herebelow.

Figure 9:
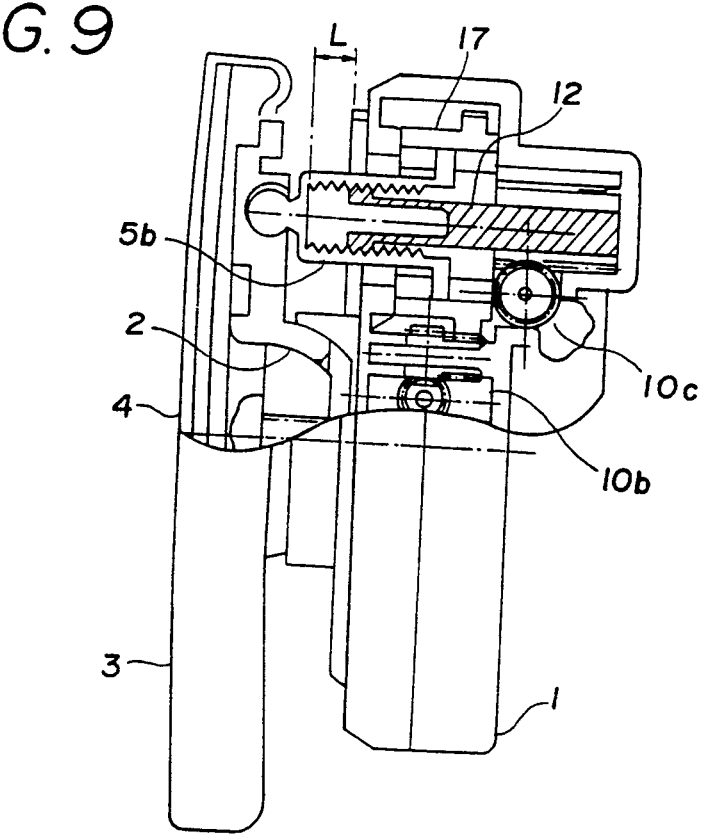

FIG. 9 shows the adjustment of mirror angle for rear viewing during ordinary car driving. The forward run of the motor 10b is transmitted to the driving cylinder 17 and plunger 5b by means of the last-stage gear 17a of the reduction gear train 11b and so the plunger 5b is screwed axially since the female thread 5b1 thereof is in mesh with the male thread 12b of the driving shaft 12. Therefore, in consideration of the driver's sitting height and other reasons, the motor 10b is driven to screw the plunger 5b for determining the distance L between the plunger 5b and driving shaft 12, thereby adjusting the vertical posture of the mirror 4.

Figure 10:
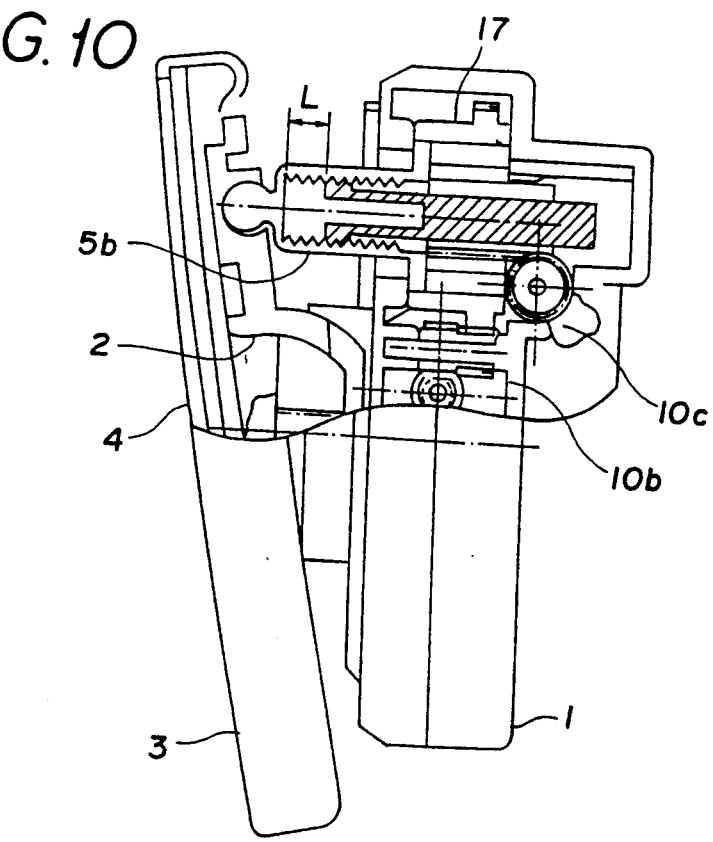

FIG. 10 shows the mirror 4 tilted further down by driving the motor 10c from the position shown in FIG. 9. In this case, the forward run of the motor 10c is converted by means of the pinion 19 and rack 18 to an axial sliding of the slider 50. Therefore, the plunger 5b is not rotated, but pushed axially by the slider 50 while the distance L between the plunger 5b and driving shaft 12 is maintained unchanged. When the spherical member 3a of the mirror body 3 abuts at a portion thereof the flat bottom of the spherical seat 1a, the friction clutch is released and the motor 10c is stopped from running. With the mirror 4 in this position, the rear wheel can be viewed.

To return from the rear-viewing position for rear-wheel checkingto the initial rear-viewing position for ordinary car driving, the motor 10c is put into reverse run to slide the plunger 5b backward. The friction clutch is put into engagement, the cylindrical member 18 and driving shaft 12 slide together while the distance L between the plunger 5b and driving shaft 12 remains unchanged. When the rear end of the cylindrical member 18 abuts the inner wall of the drive unit 1, the motor 10c is stopped from running.

Thus, the change from the rear-viewing position for ordinary car driving to that for rear-wheel checking or vice versa is attained as the slider 50 is slid forward or backward over a predetermined distance while the distance L between the plunger 5b and driving shaft 12, adjusted according to the physical conditions of each driver, is kept unchanged. Therefore, the mirror angle initially adjusted can be restored accurately and quickly.

Figure 11:
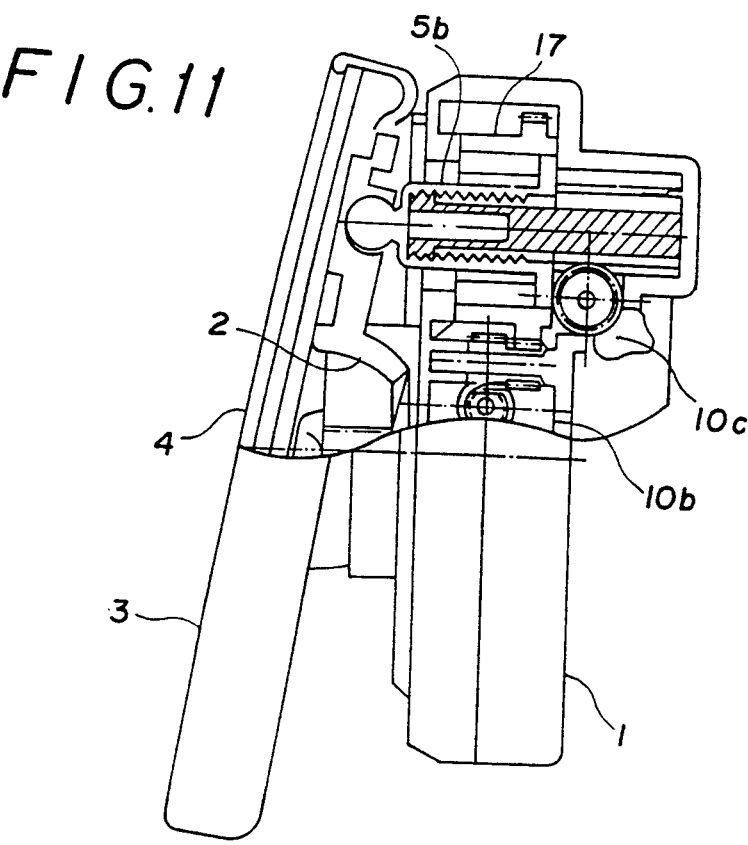

FIG. 11 shows a mirror angle with which the mirror 4 is directed more upward than the mirror 4 standing tilted as shown in FIG. 9. For this mirror angle, the motor 10c is put into reverse run to screw the plunger 5b backward until the distance L between the plunger 5b and driving shaft 12 becomes nearly zero. The change from this mirror posture to the rear-viewing position for rear-wheel checking shown in FIG. 12 can be done in the same manner as the change from the position in FIG. 9 to that in FIG. 10. In this case, the mirror body 3 is tilted down to the pivoting limit of the ball-and-socket joint 2.

Figure 12:
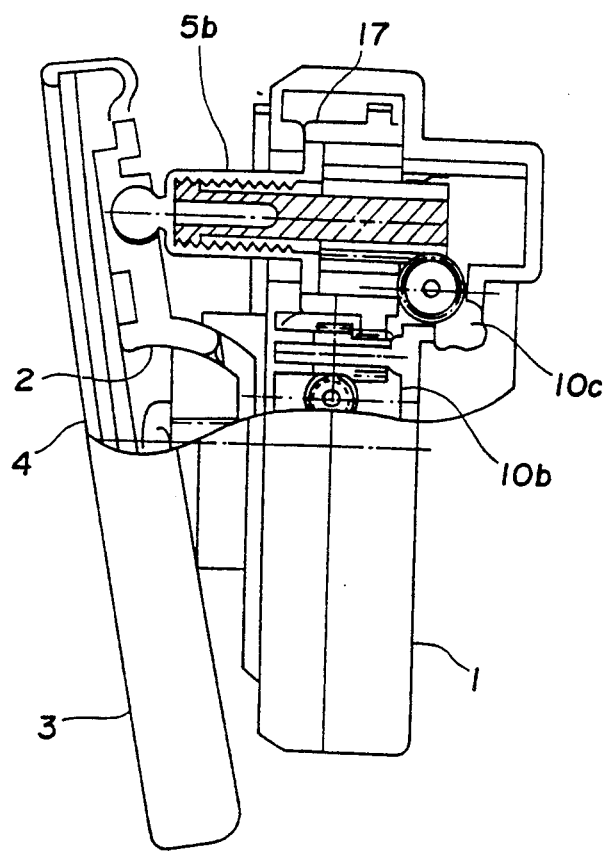

Therefore, the rear-viewing position for rear-wheel checking in FIG. 10 and that in FIG. 12 can be the same in mirror angle as each other while they are different from each other concerning the distance L between the plunger 5b and driving shaft 12.

Figure 13:
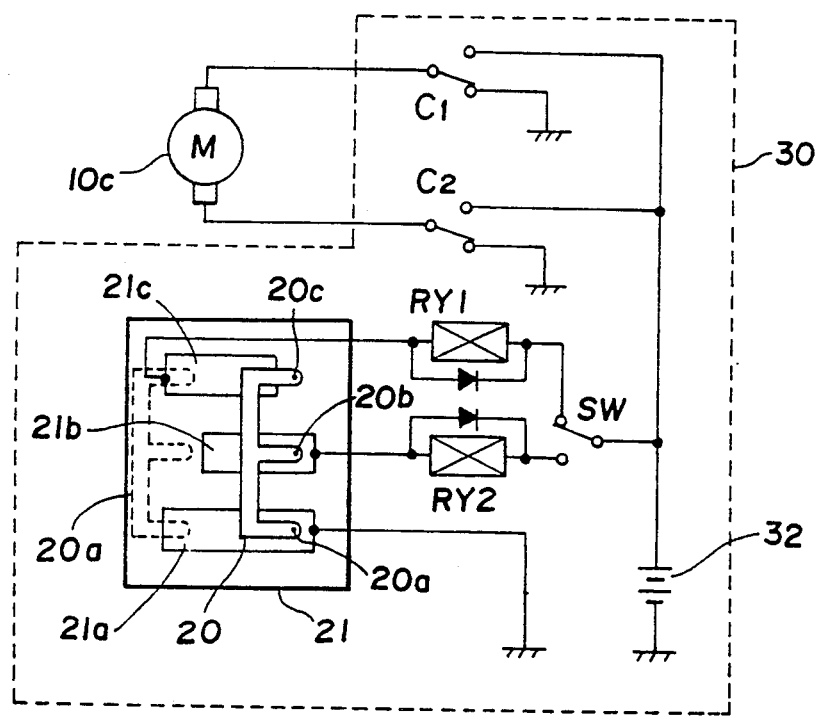

This embodiment is provided with a circuit 30, shown in FIG. 13, which controls the running of the motor 10c. This control circuit 30 comprises three fixed contact plates 21a, 21b and 21c formed on a circuit board 21 fixed within the drive unit 1, and a moving contact plate 20 fixed to the outer wall of the square cylindrical member 18 opposite to the outer wall on which the rack 18a is formed and which has three contacts 20a, 20b and 20c corresponding to the fixed contact plates 21a, 21b and 21c, respectively. The moving contact plate 20 is in resilient and electrical contact with the circuit board 21. The fixed contact plates 21a and 21b are connected to coil ends of relays RY1 and RY2, respectively, of which the other coil ends are connected to the positive pole of a power source 32 by means of a switch SW. The fixed contact plate 21c is connected to the negative pole of the power source 32. When the coil of the relay RY2 is energized, a relay contact C2 is connected to the positive pole of the power source 32 so that the motor 10c is put into forward run. When the coil of the relay RY1 is energized, a relay contact C1 is connected to the positive pole of the power source 32 so that the motor 10c is put into reverse run. FIG. 12 shows a mirror posture in which the mirror angle is already adjusted within the adjustable range. The contact 20a of the moving contact plate 20 is not in contact with the fixed contact plate 21a while the contacts 20b and 20c are in contact with the fixed contact plates 21b and 21c, respectively. To visually check the rear wheel of the car, the switch SW is first shift from the position shown in FIG. 13 to one coil end of the relay RY2. Then the coil of the relay RY2 is energized and the relay contact C2 is connected to the positive pole of the power source 32 so that the motor 10c starts forward run and thus the moving contact plate 20 fixed on the square cylindrical member 18 of the slider 50 moves forward (to the left in FIG. 12) along with the slider 50. When the moving contact plate 20 has moved to a position indicated with dot line, the contacts 20a and 20c are put into contact with the fixed contact plates 21a and 21c, respectively, but the contact 20b goes out of contact with the fixed contact plate 21b. The coil of the relay RY2 is deenergized, the relay contact C2 is connected to the negative pole of the power source 32 and thus the motor 10c is stopped from forward run. This mirror position is for the rear-viewing position for rear-wheel checking.

When the switch SW is shifted from the coil of the relay RY2 to the coil of the relay RY1, the mirror position is changed from the rear-viewing position for rear-wheel checking to that for ordinary car driving. Thus, the coil of the relay RY1 is energized, the relay contact C1 is connected to the positive pole of the power source 32 and thus the motor 10c is put into reverse run so that the moving contact plate 20 moves backward (to the right in FIG. 12) along with the slider 50. When the moving contact plate 20 has moved to the position indicated with solid line, the contact 20c goes out of contact with the fixed contact plate 21c while the contacts 20b and 20a are put into contact with the fixed contact plates 21b and 21a, respectively. Thus, the coil of the relay RY1 is deenergized, the relay contact C1 is connected to the negative pole of the power source 32 and the motor 10c is stopped from reverse run.

This motor-run control is just intended for stopping of the forward run when the slider 50 has been slid axially forward over a predetermined distance to a predetermined position (corresponding to a predetermined angle (for example, 60°) beyond the normal adjustable range of mirror) and also for stopping of reverse run when the slider 50 has thereafter been moved backward over a predetermined distance. Actually, however, the mirror body 3 is tilted downward as the slider 50 slides axially forward. When the spherical member 3a abuts at a portion thereof the flat bottom of the spherical seat 1a, the friction clutch is released, and after the square cylindrical member 18 forming the slider 50 has further slid over a predetermined distance, the motor 10c stops running. After the square cylindrical member 18 slides backward over the above-mentioned predetermined distance, the friction clutch is put into engagement so that the square cylindrical member 18 and the driving shaft slide together until the rear end of the cylindrical member 18 abuts the inner wall of the drive unit 1. Then, the motor 10c stops running.

In this embodiment, the speed of the motor 10c is set to a value about 1.56 times higher than that of the motor 10b and the reduction ratio of the reduction gear train 11b is set to a value about 2.3 times higher than that of the reduction gear train 11c. Therefore, the motor 10b an tilt the mirror body 3 at a speed of 3.3 sec/10° and the motor 10c can tilt the mirror body 3 at a speed of 0.5 sec/10°. Thus, the mirror body 3 can be tilted very quickly by the motor 10c.

Having described our invention as related to the embodiment shown in the accompanying drawings, it is our intention that the invention be not limited by any of the details of description, unless otherwise specified, but rather be constructed broadly within its spirit and scope as set out in the accompany claims.

What is claimed is:

1. An electrically remote-controlled type mirror assembly comprising:

a mirror;

a mirror body supporting said mirror; a casing having a ball-and-socket joint which supports said mirror body pivotably;

a pair of plungers coupled with said mirror body and so disposed within said casing as to be moved forward and backward by a pair of motors, respectively, by means of reduction gear trains, respectively, to tilt said mirror body horizontally and vertically within certain pivoting angles; and a sliding mechanism having another motor to slide at least one of said plungers axially and thus tilt said mirror body beyond one of said certain pivoting angles;

wherein said one of said plungers is formed like a tube having a female thread formed on the inner circumference thereof and also at least a protrusion extending radially from the outer circumference, wherein said one of said plungers includes a hollow driving cylinder, said driving cylinder having formed on the outer circumference thereof a last-stage gear of said reduction gear train, and a guide recess formed on the inner circumference thereof to axially guide said protrusion of said plunger, wherein said sliding mechanism includes a slider provided at one end thereof with a male thread member which is in mesh with the female thread of said one of said plungers, and having a rack on an outer surface thereof, another reduction gear train including a pinion which is in mesh with said rack, and said another motor drives said another reduction gear train, and wherein a positional relationship between said one of said plungers and said one end of said slider remains unchanged at times when said another motor slides said sliding mechanism.

2. An electrically remote-controlled type mirror assembly, comprising:

a mirror;

a mirror body supporting said mirror;

a casing having a ball-and-socket joint which supports said mirror body pivotably;

a pair of plungers coupled with said mirror body and so disposed within said casing as to be moved forward and backward by a pair of motors, respectively, by means of reduction gear trains, respectively, to tilt said mirror body horizontally and vertically within certain pivoting angles;

at least one of said plungers being formed like a tube and having a female thread formed on the inner circumference thereof;

at least one hollow driving cylinder disposed concentrically with said one of said plungers and rotated by one of said pair of motors by means of one of said reduction gear trains, said driving cylinder having a means of permitting said one of said plungers to slide relative to said driving cylinder and blocking said one of said plungers against rotation;

at least one slider disposed concentrically with said one of said plungers and having a male thread member which is in mesh with the female thread of said one of said plungers and having a rack formed on the outer surface thereof;

another reduction gear train including a pinion which is in mesh with said rack; and at least one other motor drives said another reduction gear train, whereby it is possible to slide said slider axially by means of said other motor to quickly tilt said mirror axially beyond one of said certain pivoting angles in order to check a rear wheel of a car.

3. An electrically remote-controlled type mirror assembly as set forth in claim 2, wherein said driving cylinder has formed on the inner circumference thereof at least one recess extending axially and in which a portion of said one of said plungers is engaged, said recess permitting said one of said plungers to slide relative to said driving cylinder and blocking said one of said plungers against rotation.

4. An electrically remote-controlled type mirror assembly as set forth in claim 3, wherein said one of said plungers, driving cylinder, and slider form together a telescopic structure.

5. An electrically remote-controlled type mirror assembly as set forth in claim 2, wherein said slider comprises two slidable members of a telescopic structure, one of which has said male thread member in mesh with the female thread of said one of said plungers while the other has said rack formed on the outer surface thereof, said two slidable members being coupled to each other by means of a friction clutch.

6. An electrically remote-controlled type mirror assembly as set forth in claim 5, wherein said friction clutch is adapted to be released when said mirror is tilted to a maximum angle beyond one of said certain pivoting angles.

7. An electrically remote-controlled type mirror assembly as set forth in claim 2, further comprising:

a means of controlling the running of said other motor, said controlling means being adapted to tilt said mirror between a predetermined angle within one of said certain pivoting angles and a maximum angle beyond said one of said certain pivoting angles.

8. An electrically remote-controlled type mirror assembly as set forth in claim 7, wherein said controlling means includes a control circuit responsive to the sliding distance of said slider to stop said other motor from running.

9. An electrically remote-controlled type mirror assembly as set forth in claim 2, wherein said one of said plungers tilts said mirror body vertically.

* * * * *